United States Patent [19]
Lachance

[11] Patent Number: 5,402,102
[45] Date of Patent: Mar. 28, 1995

[54] REMOTE CONTROL OPERATOR FOR GAME CALLERS

[76] Inventor: Lawrence Lachance, 151 rue Victoria, Edmundston, N. B. E3V 2H7, Canada

[21] Appl. No.: 48,299

[22] Filed: Apr. 19, 1993

[51] Int. Cl.6 .......................... G08B 3/00; G10K 9/00
[52] U.S. Cl. ............................ 340/404.1; 340/404.2; 340/384.1; 446/397
[58] Field of Search ............... 340/404.1, 406, 384 R; 446/397

[56] References Cited

U.S. PATENT DOCUMENTS

| | | | |
|---|---|---|---|
| 3,968,592 | 7/1976 | Piper | 446/193 |
| 4,862,625 | 9/1989 | Dolan | 446/397 |
| 5,111,981 | 5/1992 | Allen | 446/397 |

Primary Examiner—John K. Peng
Assistant Examiner—Daryl C. Pope

[57] ABSTRACT

A device, which is operated at a distance by pulling on a string acting upon a bellows, for blowing a stream of air under pressure into a game caller. The apparatus is used to draw an animal in a selected direction, and to attract and hold that animal's attention away from the hunter's presence.

11 Claims, 6 Drawing Sheets

REMOTE CONTROL OPERATOR FOR GAME CALLERS

This invention relates to an operator for game callers, which can be activated at a distance. Although the following description makes reference to deer hunting, the practices explained, and the advantages of using the invention are similar for other game hunt using callers of the same kind of a deer caller.

It is a common practice for a hunter to use a flutelike instrument to imitate the sound of a deer, and thereby to attract an animal. The hunter also uses camouflage and deer odour to fool the animal's senses until it comes within an appropriate sight range.

This practice requires a certain level of skill and discipline, which is not given to all hunters. Therefore, this method is not always successful.

Moreover, the hunter himself becomes the origin of the sound. The animal approaches with maximum vigilance. Consequently, the slightest movement or mumble is often sufficient to betray the hunter's strategy, and to scare the deer away. Even the time to raise the rifle, or to tend the bow is often as much as is needed for the animal to jump and reach cover.

It is also a common practice with the hand-held flute-like caller, that the effectiveness of the call depends on the breath of the user, and on his ability to repeatedly imitate the sound of an animal. Hence, a slight gasp at the last call can ruin the whole luring exercise.

It is an object of this invention to provide a means to operate a game caller from a remote location. The remote control operator is attached to a tree along the edge of a clearing, or at a similar thin wooded area. A string is then attached to a lever located on one side of the device. The string is threaded around trees, or into eyelets attached to trees, as far as the hunter's hiding-place. The hunter can, by pulling on the string, operate the game caller. The device becomes the origin of the sound, and thus remain the object of attraction for the animal.

One advantage of using this remote control operator is that a hunter can observe with assurance an animal attracted to a location which is, to that hunter's favour.

Another advantage of using the new invention is that the amount of air blown into the game caller, and the opening of the sounding compartment can be calibrated to produce a constant and effective call.

According to the present invention, the remote control operator for game callers consists of a box-shaped housing having a set of straps and buckles to retain that housing to a tree. A shaft protrudes from one side of the housing, and connects to a lever. A string, which is attached to the end of this lever, is used to rotate the lever about the axis of the shaft, and thereby to activate the device.

Inside the housing, a bellows is spring loaded in the closing direction. A latching device, which is mounted on the said shaft is used, in reaction to the pull of the said lever, to stretch the bellows and to release it after a fixed angular displacement, Therefrom, a stream of air under pressure is forced into a game caller to produce the call.

A compartment in the lower part of the housing contains the game caller. The opening of this compartment is obstructed by a sliding blade. This blade is used to muffle the call to suit the echo of the hunting site.

A preferred embodiment of this invention and the typical instructions to use it will now be described by way of examples, with references to the accompanying drawings, in which:

FIG. 1 is a top view of the remote control operator. The figure illustrates the straps and buckles used to retain the device to a tree.

FIG. 2 is a front view of the remote control operator. The lever activating the device is also illustrated with the pull-string, and the lever's angular stoppers, FIG. 3 illustrates the side view of the device. The figure illustrates the said straps and buckles, and it illustrates the sliding blade which is used to muffle the call.

FIG. 4 illustrates a side view of the device, with the front wall removed. The figure illustrates the inside of the housing. The bellows is shown in the closed position and the latching device is shown in the fully engaged position.

Figure 1:
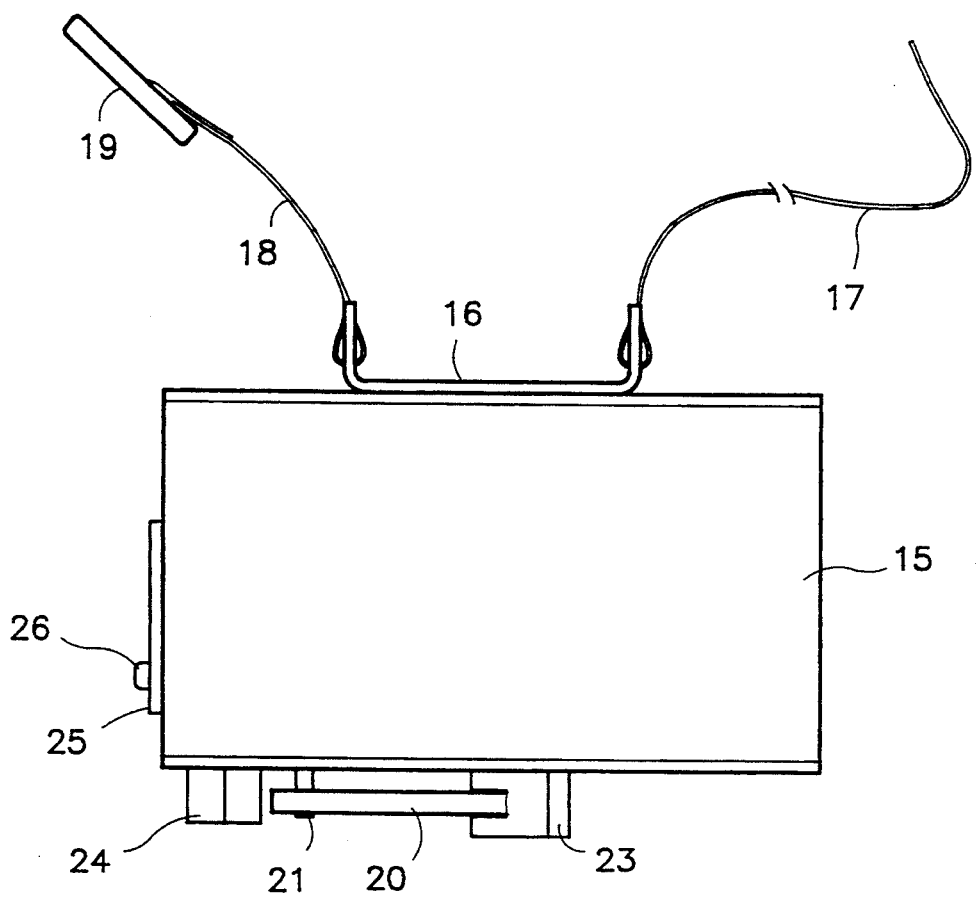
Figure 2:
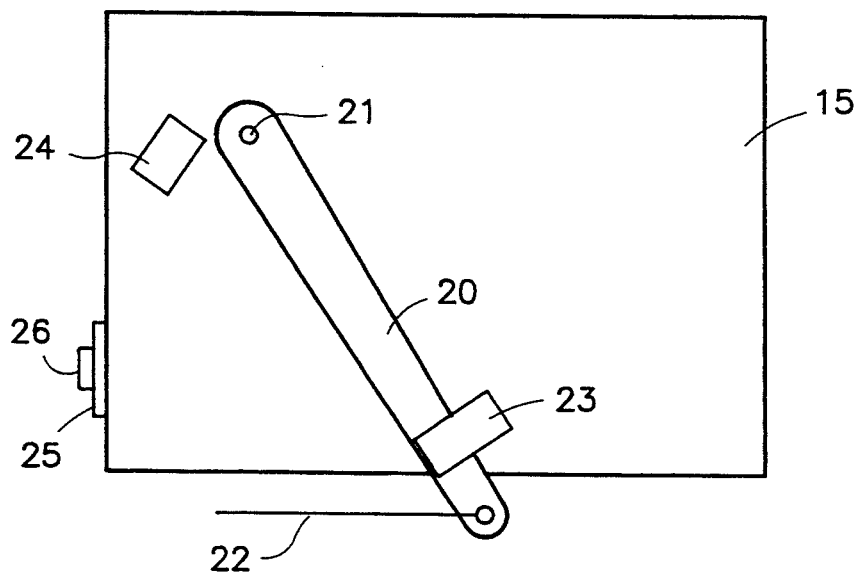
Figure 3:
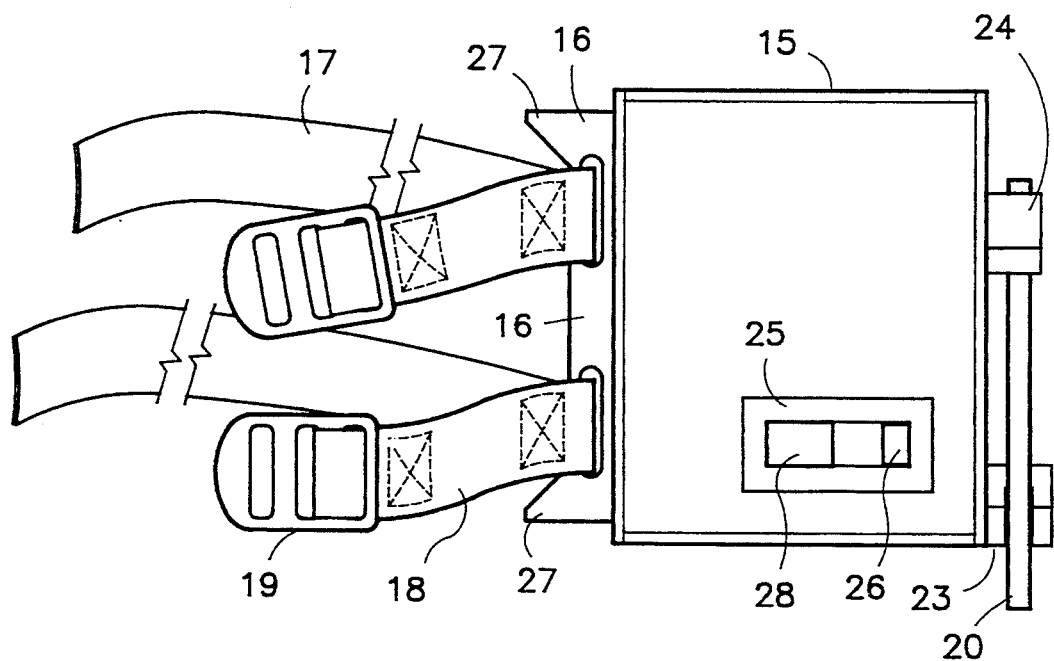

Referring to the FIG. 1 to no. 3, the remote control operator consists of; a housing 15, containing the operating mechanism and the game caller, a support bracket 16 attached to the rear side of the said housing 15, a set of straps 17, and another set of straps 18 terminated by buckles 19.

The straps 17 and 18 are used to retain the housing 15 against a tree. Four prongs 27 at the outside corners of the bracket 16 rest against the bark of the tree to provide positive grab to retain the housing 15 in place.

A shaft 21 extends through the front cover of the housing 15. A lever 20 is rigidly mounted on the end of the said shaft 21. The shaft 21 is spring loaded in the counter-clockwise direction when viewed from the front cover. The lever 20 can be rotated in the clockwise direction about the axis of the shaft 21, by pulling on the string 22, which is attached to the lower extremity of the said lever 20.

An angular stopper 23 prevents the lever 20 from going too far in the counter-clockwise direction. Another angular stopper 24 prevents the lever 20 from going too far in the clockwise direction.

At the end of the housing 15, a slide frame 25 and a slide blade 26 vary the size of the opening 28 of the sounding compartment 29. This sliding blade 26 is adjustable to increase or to reduce the intensity of the call according to the particularity of the site and to the hunter's flair.

Figure 4:
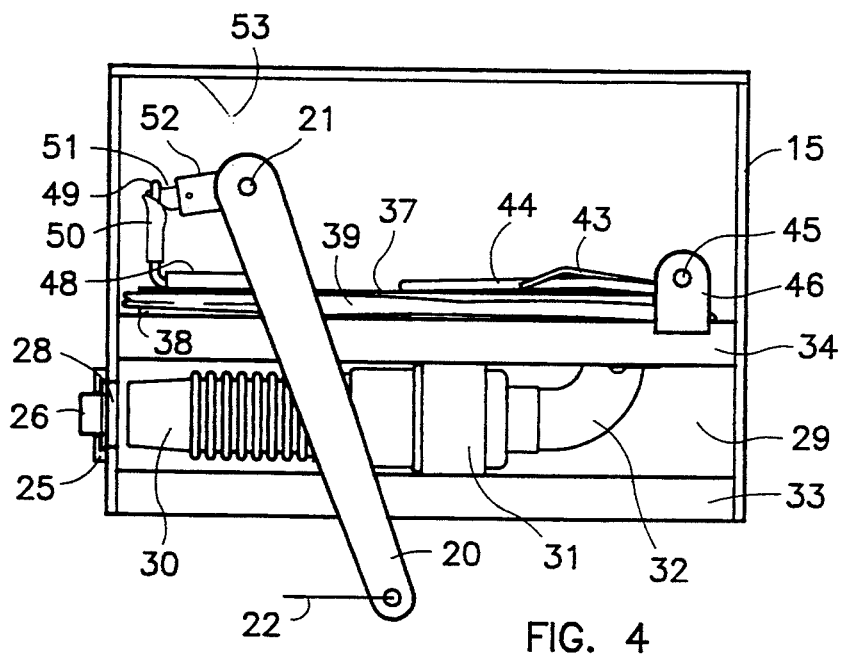
Figure 5:
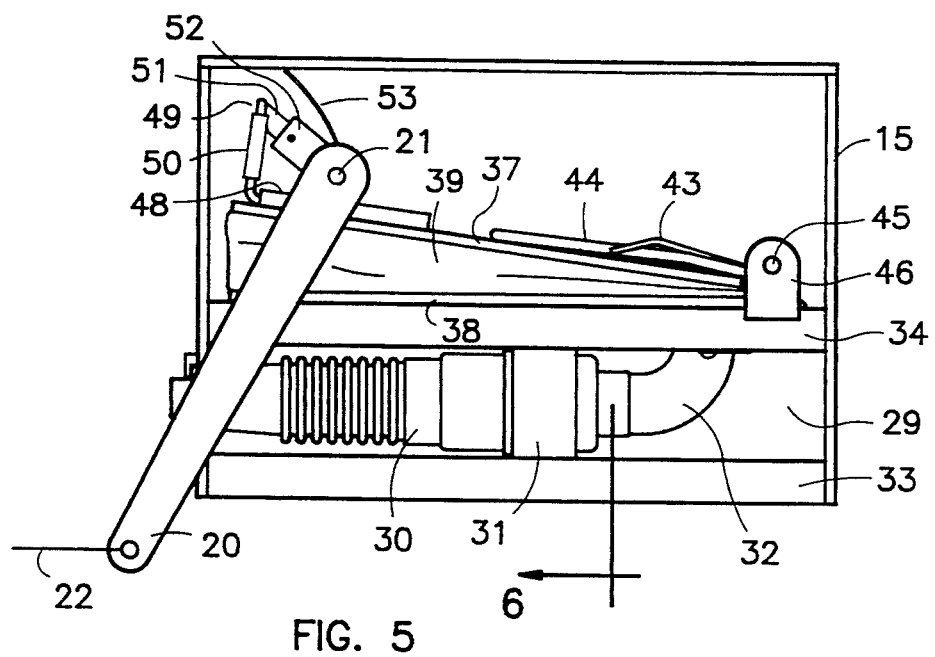
FIG. 5 shows the bellows in the fully stretched position.
Figure 6:
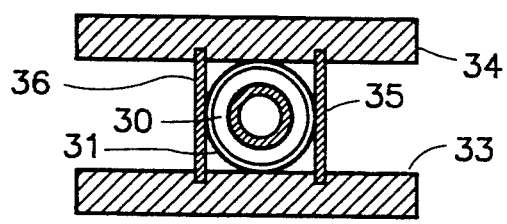
FIG. 6 is a cross section of the sounding compartment, along the line 6 of FIG. 5.
Figure 7:
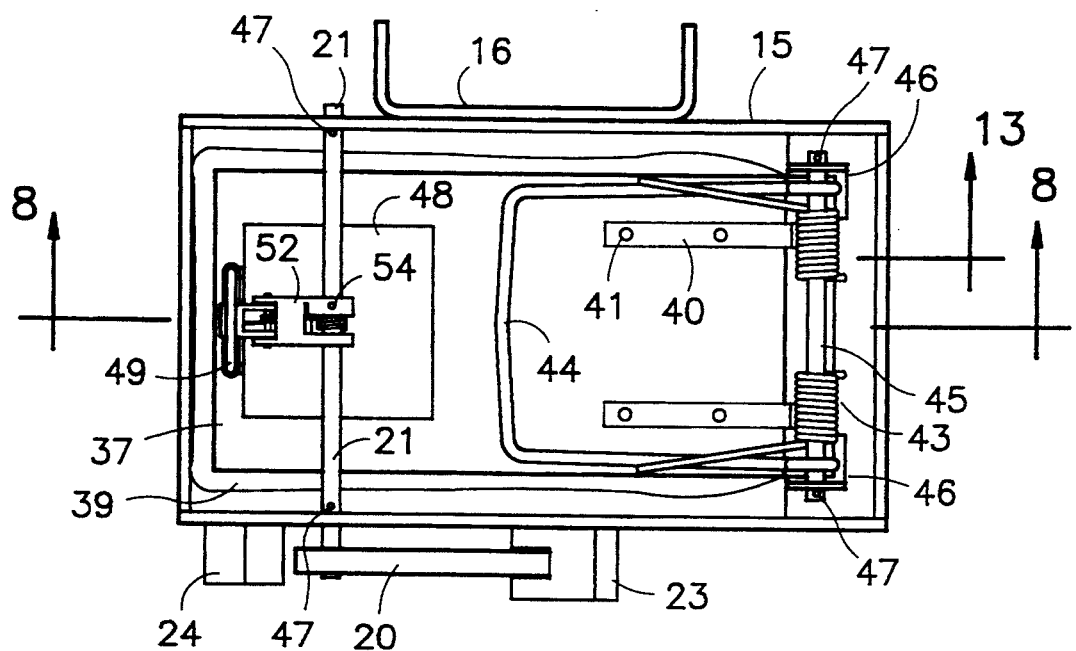
FIG. 7 is a cross section of the housing, showing the top view of the bellows and the latching device.
Figure 8:
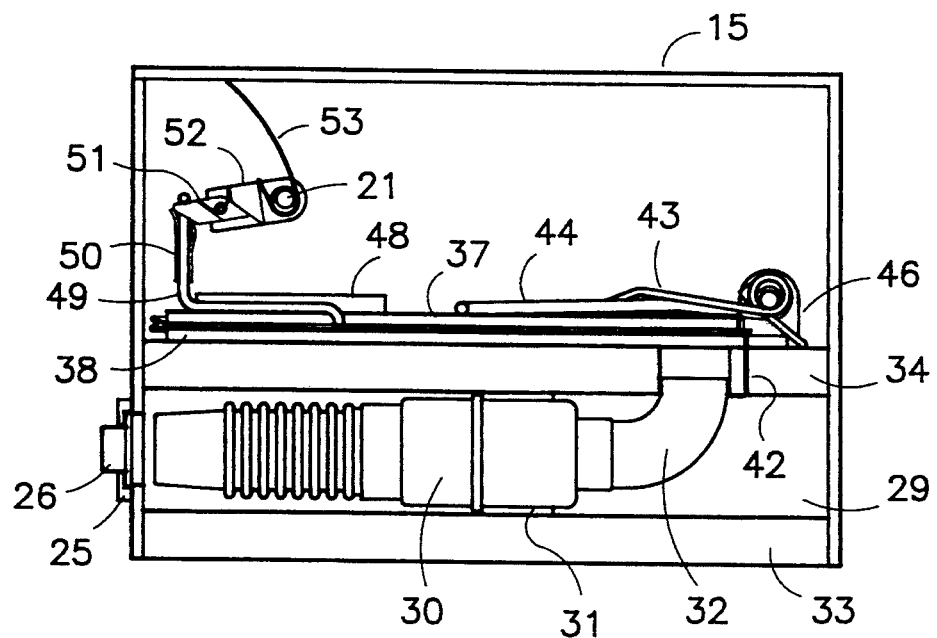
FIG. 8 is a cross section of the housing along the line 8 of FIG. 7.
Figure 9:
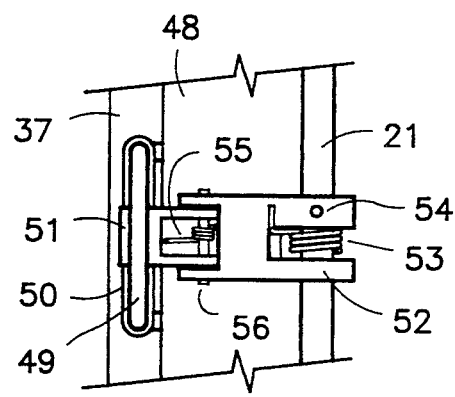
FIG. 9 illustrates an enlarged top view of the latching device.

The FIGS. 4, 5, and 6 illustrate the operating mechanism and the game caller 30. A spongy band 31 around the body of the game caller 30 isolates the said caller 30 from possible resonance with the surrounding structural pieces of the housing 15, such as, with the bottom piece 33, with the divider piece 34 and with other vertical dividers 35, 36 along each side of the said caller, which dividers 35, 36 are defining a sounding compartment 29 between the bottom piece 33 and the divider piece 34. The spongy band 31 also retains the caller 30 in place inside the sounding compartment 29. The caller 30 is connected to the bellows by means of a hollow conduit 32.

Referring to the FIGS. 4, 5, 6, 7 and 8, the operating mechanism consists of a spring loaded bellows and a latching device to actuate the bellows. The bellows consists of a top plate 37, a bottom plate 38, and a airtight cloth 39 attached to the perimeter of both plates 37 and 38.

A set of hinges 40 are attached to one extremity of the top plate 37 by means of fasteners 41. The hinges 40 pivot about retaining clips 42, which are attached to the divider piece 34.

The top plate 37 is spring loaded in the counterclockwise direction, when viewed from the front cover, by means of two torsion springs 43 acting upon an equalizer bar 44. The springs 43 and the equalizer bar 44 are pivoted on a shaft 45 at the hinged end of the top plate 37. The shaft 45 is held in place at each of its extremities by two pivot brackets 46.

Both the shaft 45 and the shaft 21 are held in their axial position by transverse pins 47 through the said shafts 45 and 21, and adjacent to the pivot holes.

The bellows is actuated by means of a latching device pulling upward on the extremity of the top plate 37, causing the top plate 37 to pivot in the clockwise direction about its hinged end, and thereby to stretch the cloth 39.

Figures 10, 11:
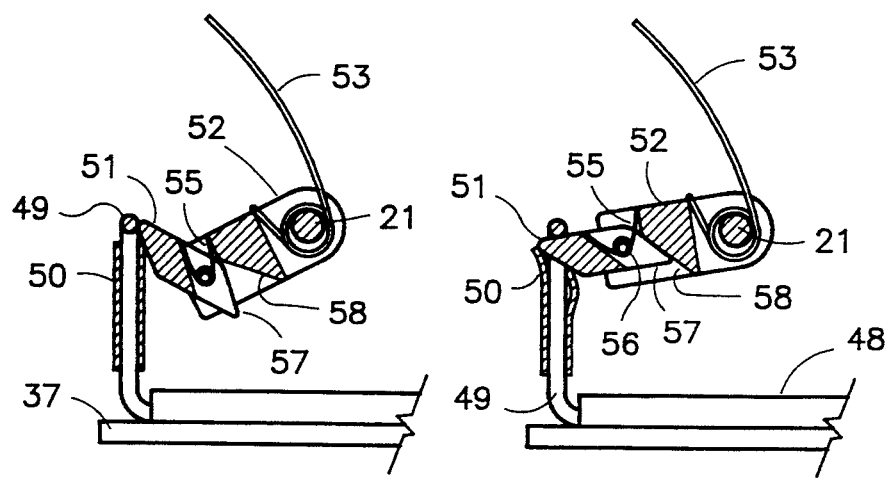
FIG. 10 illustrates a cross-section of the latching device in the latching position.
FIG. 11 illustrates a cross-section of the latching device in the latched position.

The latching device consists of a latch body 52 and a latch finger 51. The latch body 52 is held rigidly on the shaft 21 be means of a transverse pin 54. The latch finger 51 is pivoted, and is restricted to a certain angular displacement, into the latch body 52, as it is better explained later, on FIGS. 10, and 11.

The action of the lever 20 causes the latch body 52 to rotate about the shaft 21. This rotation causes the latch finger 51 to engage under, and pull on the bar 49. The pull on the bar 49, which is held into a pull block 48, which in turn is attached to the top plate 37, causes the bellows to stretch open. Once the angular displacement of the latch finger 51 reaches a certain point, which point is determined by the intersection of the circular paths of both the latch finger 51 and the pull bar 49. The latch finger 51 disengages from the pull bar 49, and release the top plate 37.

Upon the release of the latching device, the action of the springs 43 forces the bellows to close, and thus pushes a stream of air into the conduit 32 and through the caller 30, to produce the call.

Referring to FIGS. 9, 10, 11 and 12, the latch body 52 and the shaft 21 are spring loaded in the counter-clockwise direction by the torsion spring 53. The latch finger 51 is also spring loaded in the counter-clockwise direction within the latch body 52 and about a pivot pin 56, by another torsion spring 55.

The angular displacement of the latch finger 51 is limited by the heel 57 of the latch finger 51 coming into contact with a stop surface 58 on the latch body 52. This limit enables the latch finger 51 to rotate and slide over the pull bar 49, to cause a latching action, and enables the latch finger 51 to remain rigid when turning in the pulling direction.

The snappy noise of the heel 57 coming into contact with the stop surface 58 under the action of the torsion spring 55, is attenuated by dampening the motion of the latch finger 51 with an elastic band 50. The elastic band 50 is wrapped across the opening of the pull bar 49.

Figure 12:
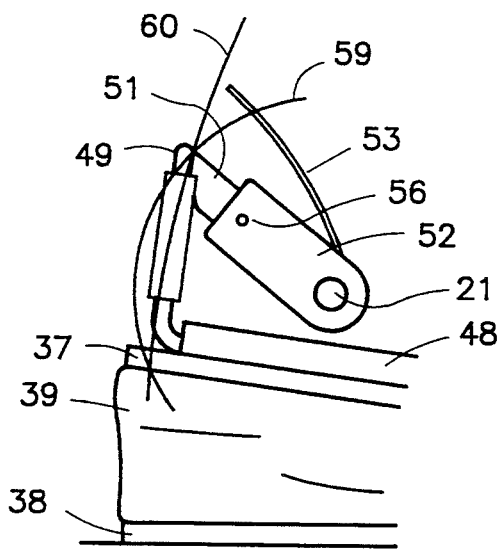
FIG. 12 illustrates the latching device in the ready-to-let-go position. The figure also explains the circular displacement about their respective pivot points for the latching device and for the bellows' pull bar.

The FIG. 12 illustrates the circular path 59 of the tip of the latch finger 51, about the shaft 21, and it illustrates the circular path 60 of the pull bar 49 about the hinged end of the top plate 37. The circular paths 59 and 60 define an area, shown by the intersection of both circles, where the latch finger 51 is fully engaged under the pull bar 49. The upper intersection of the circular paths 59 and 60 indicates the release point of the pulling action.

Figure 13:
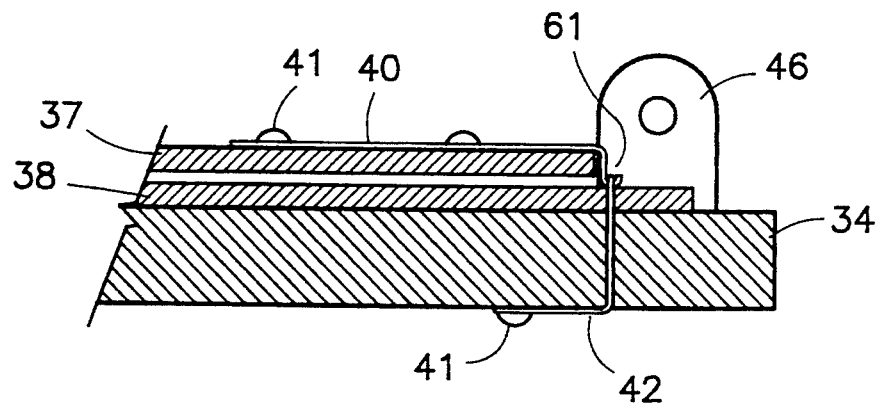
FIG. 13 is a cross-section of the hinge of the bellows along the line 13 of FIG. 7.

The hinges 40 of the top plate 37 are illustrated more clearly on the FIG. 13. The end of the hinge 40 is bent into the shape of a hook 81. This hook 81 pivots about the retaining clip 42. The clips 42 extend through the divider piece 34 and are held in place by fasteners 41.

Figure 14:
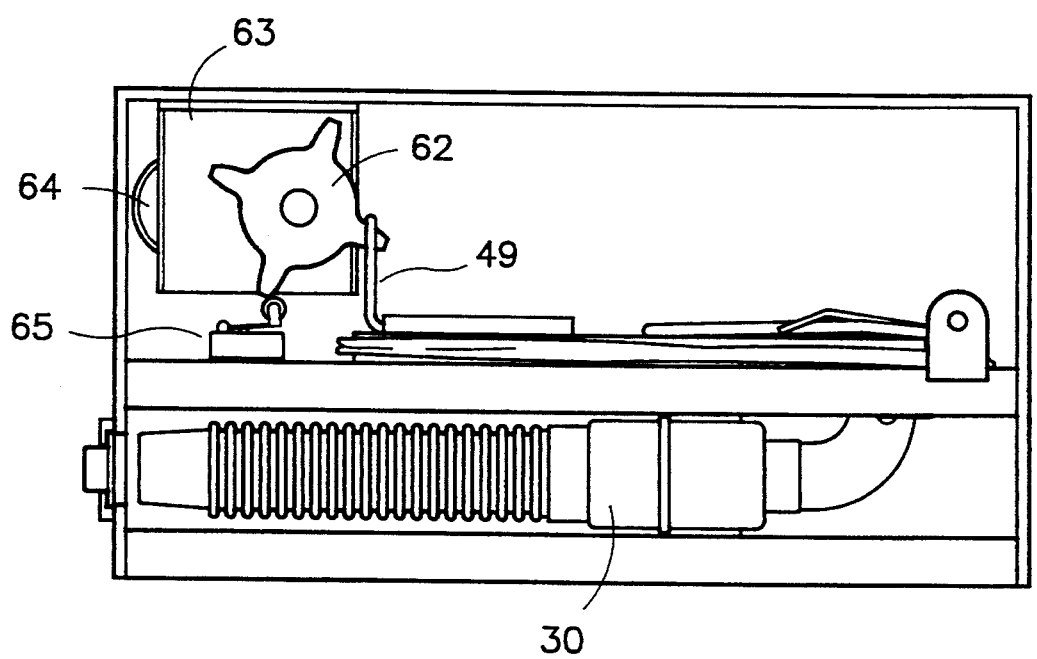
FIG. 14 illustrates an alternate means of activating the device. The toothed wheel shown is driven by an electric motor, which is controlled at a distance from a radio signal given by a portable transmitter.

The remote control operator can also be activated electronically by a portable transmitter. In this case the remote control operator is equipped with a battery 66 and an electronic circuit 67. A toothed wheel 62, driven by a speed reducer 63 and a DC motor 64, engages with the pull bar 49 to lift the bellows in a very similar manner as for the manual operator. As it can also be seen on the FIG. 14, the rotation of the toothed wheel 62 is controlled by a limit switch 65. This limit switch 65 acts as an end-of-the-cycle switch to de-energize the electronic circuit 67. Another signal from the transmitter is required to repeat the call.

The previous description of the invention shall not constitute a limitation in the scope of applications of this invention. Also, it shall not constitute a limitation in the possible configuration of its elements. The remote control operator can be used to sound callers for several game birds and game animals. The size of the sounding compartment, the volume of the bellows and the length of the stroke can be modified and calibrated to produce calls of different intensity, different tone and different duration.

The embodiments of the invention in which exclusive property or privilege is claimed are defined as follows:

1. An apparatus for operating a game caller with consistency of tone, span and intensity, having;
   a game caller,
   a bellows connected to said game caller,
   a spring means attached to and acting upon said bellows,
   an actuator means comprising a lever, said actuator means being movable in a loading direction and in a return direction, said actuator means comprising also a disengagement means located at a fixed disengagement point towards said loading direction,
   wherein moving said lever in a return direction causes said actuator means to engage with said spring means and,
   wherein moving said lever in a loading direction causes said actuator means to load said spring means and to expand said bellows until said fixed disengagement point is reached, whereat said disengagement means is set to disengage said actuator means from said spring means, causing said bellows to collapse under a loading of said spring means, letting thereby a fixed amount of air under a fixed pressure gradient into said game caller.

2. An apparatus as claimed in claim 1 wherein said lever is spring actuated in said return direction.

3. An apparatus as claimed in claim 2 wherein said lever has attachment means to receive one end of a string, such that a movement of said lever in said loading direction can be done from a remote location by pulling on said string.

4. An apparatus as claimed in claim 1 wherein said fixed disengagement point is defined by the intersection of a travel path of said actuator means and a travel path of said spring means.

5. An apparatus as claimed in claim 1 wherein said actuator means comprises a finger-like latch being pliable about a flexing means, in said loading direction only, 6. An apparatus as claimed in claim 5 wherein a latching noise from said latch engaging with said spring means is muffled by an elastic band wrapped about said spring means near a point of engagement thereon, such that said elastic band interferes with said latch during engagement with said spring means.

7. An apparatus as claimed 1 wherein said game caller is contained within a sounding compartment of said apparatus, and wherein said sounding compartment has a sliding gate as a means of varying an opening on said sounding compartment to thereby change a consistency of intensity of the call produced by said game caller when operating said apparatus.

8. An apparatus as claimed in claim 1 wherein said game caller, said bellows, said spring means, are contained within a housing, and wherein said lever is outside said housing.

9. An apparatus as claimed in claim 8 wherein said lever has attachment means to receive one end of a string, such that a movement of said lever in said loading direction can be done from a remote location by pulling on said string.

10. A remote control apparatus for operating a game caller with consistency of tone, span and intensity, having;

a game caller, a bellows connected to said game caller, a spring means attached to and acting upon said bellows, an actuator means comprising, a rotary drive means and a toothed wheel connected to said drive means, wherein a rotation of said toothed wheel causes one tooth to engage with said spring means, to load said spring means, and to expand said bellows until reaching a fixed disengagement point, whereat an arcuate path of said tooth distances a path of said spring means, whereby said tooth is disengaged from said spring means, causing said bellows to collapse under a loading of said spring means, letting a fixed amount of air under a fixed pressure gradient into said game caller.

11. A remote control apparatus as claimed in claim 10 wherein said .game caller is contained within a sounding compartment of said apparatus, and wherein said sounding compartment has a sliding gate as a means for varying an opening on said sounding compartment, to thereby change a consistency of intensity of the call produced by the game caller when operating said apparatus.

* * * * *